US012730401B2

(12) United States Patent
Yamada et al.

(10) Patent No.: US 12,730,401 B2
(45) **Date of Patent: *Sep. 8, 2026**

(54) IMAGE FORMING SYSTEM INCLUDING VARNISH APPLYING UNIT

(71) Applicant: CANON KABUSHIKI KAISHA, Tokyo (JP)

(72) Inventors: Toshiyuki Yamada, Tokyo (JP); Yoshiro Tsukada, Chiba (JP); Masami Hano, Chiba (JP); Shingo Hirota, Ibaraki (JP); Taro Hanazato, Tokyo (JP); Daisuke Katayama, Chiba (JP); Kyohei Kikuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/947,254

(22) Filed: Nov. 14, 2024

(65) Prior Publication Data

US 2025/0068110 A1 Feb. 27, 2025

Related U.S. Application Data

(62) Division of application No. 18/221,051, filed on Jul. 12, 2023, now Pat. No. 12,164,253.

(30) Foreign Application Priority Data

Jul. 13, 2022 (JP) ................................ 2022-112117

(51) Int. Cl.

| | |
|---|---|
| ***G03G 15/20*** | (2006.01) |
| ***B05D 7/26*** | (2006.01) |
| ***G03G 15/00*** | (2006.01) |

(52) U.S. Cl.

CPC ........... *G03G 15/5041* (2013.01); *B05D 7/26* (2013.01); *B05D 2501/00* (2013.01); *G03G 2215/209* (2013.01)

(58) Field of Classification Search

USPC ........................................................... 399/49

See application file for complete search history.

(56) References Cited

U.S. PATENT DOCUMENTS

| | | | |
|---|---|---|---|
| 2010/0309496 | A1 | 12/2010 | Ido |
| 2019/0193415 | A1 | 6/2019 | Yamamoto |
| 2020/0288030 | A1 | 9/2020 | Tsukamoto |

(Continued)

FOREIGN PATENT DOCUMENTS

| | | | |
|---|---|---|---|
| JP | 2003-333323 | A | 11/2003 |
| JP | 2010-283604 | A | 12/2010 |

(Continued)

OTHER PUBLICATIONS

Office Action dated Jun. 30, 2026, in Japanese Patent Application No. 2022-112117.

*Primary Examiner* — Quana Grainger
(74) *Attorney, Agent, or Firm* — Venable LLP

(57) ABSTRACT

An image forming system an image forming apparatus, a varnish applying apparatus, an input unit, a first image processing unit, and a second image processing unit. The image forming apparatus forms a toner image on a recording material on the basis of image data obtained by subjecting first image data to data change processing. The varnish applying apparatus forms a varnish image on the recording material on the basis of image data obtained by subjecting second image data to the data change processing.

6 Claims, 15 Drawing Sheets

(56) References Cited

U.S. PATENT DOCUMENTS

| | | | |
|---|---|---|---|
| 2023/0073102 | A1 | 3/2023 | Kitajima |
| 2024/0012349 | A1 | 1/2024 | Hirota et al. |
| 2024/0012354 | A1 | 1/2024 | Kikuchi et al. |
| 2024/0036505 | A1 | 2/2024 | Katayama et al. |
| 2024/0045360 | A1 | 2/2024 | Hanazato et al. |

FOREIGN PATENT DOCUMENTS

| | | | |
|---|---|---|---|
| JP | 2016-072723 | A | 5/2016 |
| JP | 2018-069669 | A | 5/2018 |
| JP | 2019-111813 | A | 7/2019 |
| JP | 2020-145598 | A | 9/2020 |
| JP | 2021-156844 | A | 10/2021 |
| JP | 2021-173930 | A | 11/2021 |

(a)

(b)

(a)

(b)

(a)

(b)

IMAGE FORMING SYSTEM INCLUDING VARNISH APPLYING UNIT

FIELD OF THE INVENTION AND RELATED ART

The present invention relates to an image forming system including an image forming apparatus for forming a toner image on a recording material, and a varnish applying apparatus capable of forming a varnish image on the recording material.

Recently, separately from the toner image formed on a recording material with a developer, in order to decorate the toner image, a varnish image using colorless and transparent varnish is formed on the toner image. As an apparatus for of forming the varnish image, for example, a varnish applying apparatus of an ink jet type (called a varnish coater) is used. The varnish coater applies varnish partially on the recording material (so-called spot varnish coating) and thus forms a varnish image desired by a user. Such a varnish coater is disclosed in United States Patent Application Publication No. US2019/0193415 A1.

SUMMARY OF THE INVENTION

According to an aspect of the present invention, there is provided an image forming system comprising: an image forming apparatus configured to form a toner image on a recording material; a varnish applying apparatus configured to form a varnish image on the recording material; an input unit to which data change processing including at least one of reduction, magnification, and arrangement of first image data on the toner image is inputted; a first image processing unit configured to subject the first image data to the data change processing inputted to the input unit; and a second image processing unit configured to subject second image data on the varnish image to the data change processing inputted to the input unit, wherein the image forming apparatus forms the toner image on the recording material on the basis of image data obtained by subjecting the first image data to the data change processing, and wherein the varnish applying apparatus forms the varnish image on the recording material on the basis of image data obtained by subjecting the second image data to the data change processing.

According to another aspect of the present invention, there is provided an image forming system comprising: an image forming apparatus configured to form a toner image on a recording material; a varnish applying apparatus configured to form a varnish image on the recording material; an input unit to which data change processing including at least one of reduction, magnification, and arrangement of first image data on the toner image is inputted; a first image processing unit configured to subject the first image data to the data change processing inputted to the input unit; a second image processing unit configured to subject second image data on the varnish image to the data change processing inputted to the input unit, and a selecting unit configured to select whether or not the second image data is subject to the data change processing by the second image processing unit, wherein the image forming apparatus forms the toner image on the recording material on the basis of image data obtained by subjecting the first image data to the data change processing, wherein in a case that selection that the second image data is subjected to the data change processing by the second image process unit is made, the varnish applying apparatus forms the varnish image on the recording material on the basis of the image data obtained by subjecting the second image data to the data change processing by the second image process unit, and wherein in a case that the selection that the second image data is subjected to the data change processing by the second image process unit is not made, the varnish applying apparatus forms the varnish image on the recording material on the basis of the second image data which is not subjected to the data change processing.

Further features of the present invention will become apparent from the following description of exemplary embodiments with reference to the attached drawings.

Figure 4:
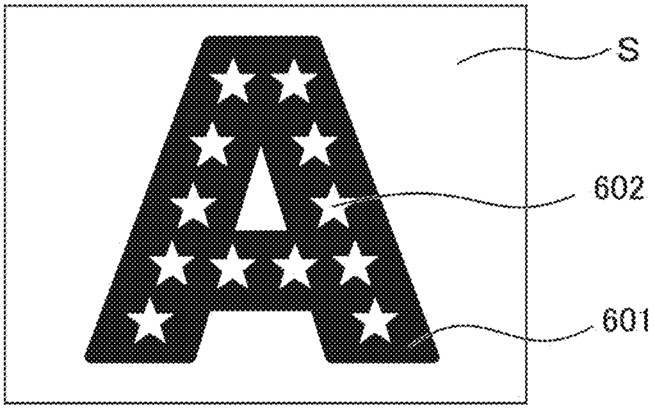
Figure 4:
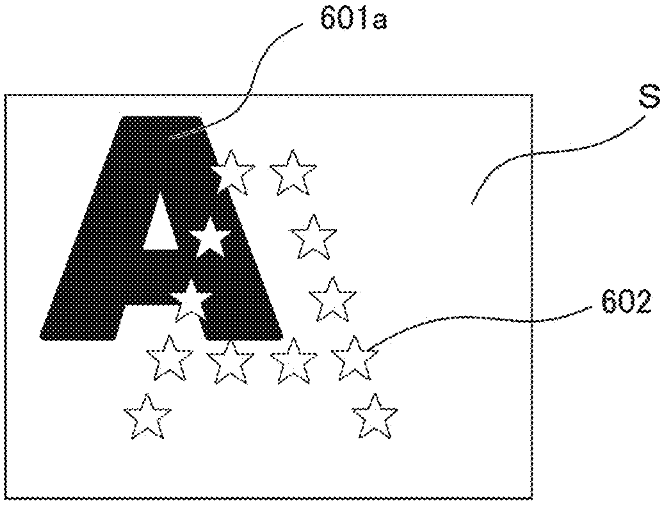

Parts (a) and (b) of FIG. 4 are schematic views for illustrating a conventional example, in which part (a) shows a toner image and a varnish image before layout change of the toner image, and part (b) shows a toner image and the varnish image after the layout change of the toner image.

Figure 5:
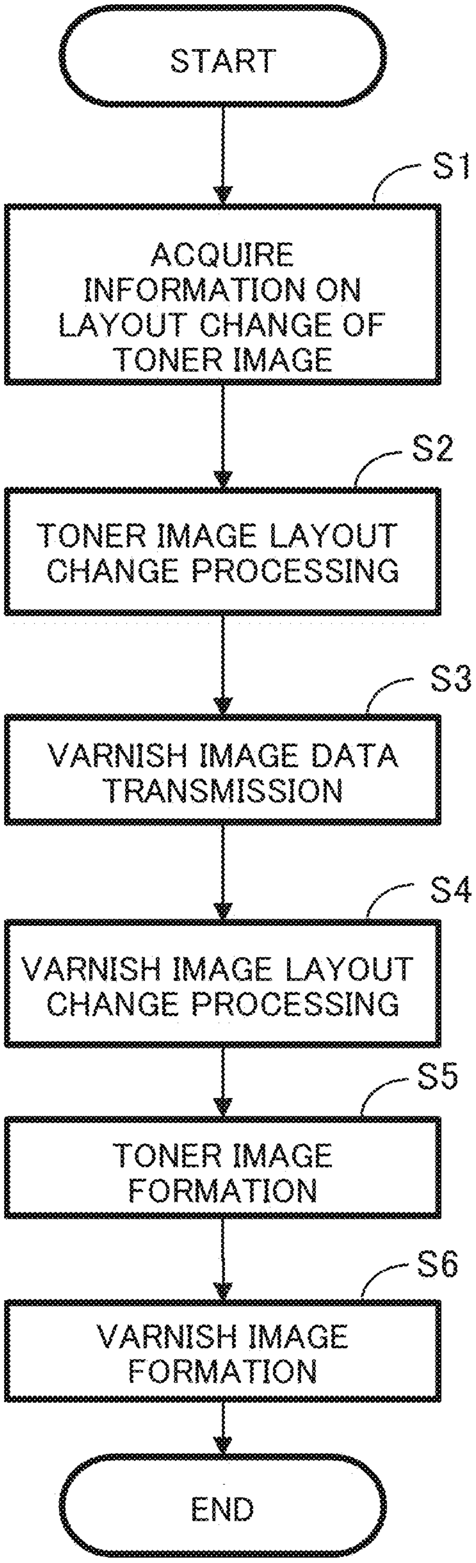

FIG. 5 is a flowchart showing layout change processing in a first embodiment.

Figure 6:
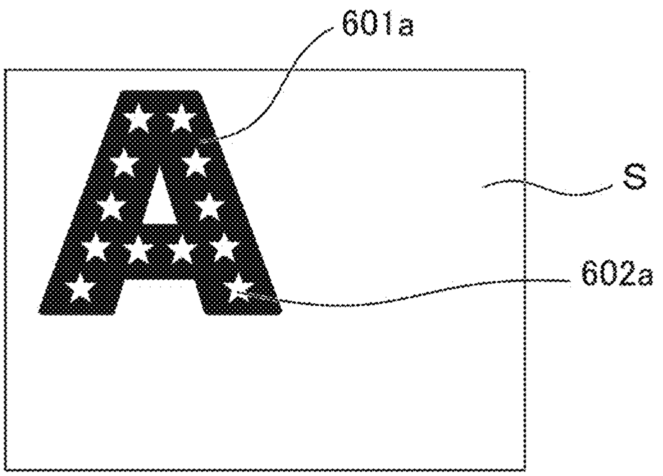

FIG. 6 is a schematic view for illustrating layout change of the varnish image in accordance with the layout change of the toner image.

Figure 7:
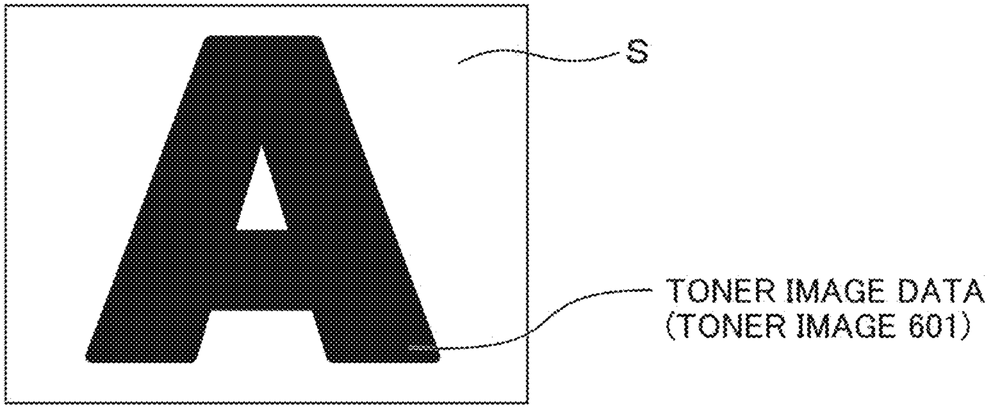
Figure 7:
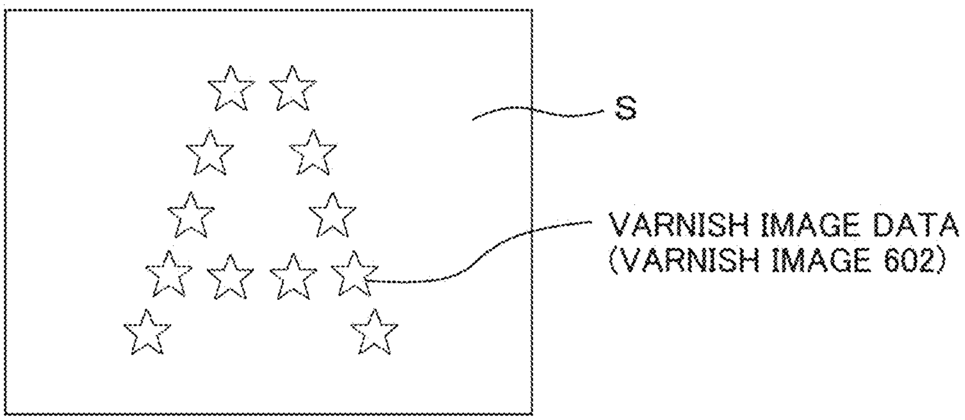

Part (a) of FIG. 7 is a schematic view showing a toner image based on toner image data before the layout change, and part (b) of FIG. 7 is a schematic view showing a varnish image based on varnish image data before the layout change.

Figure 8:
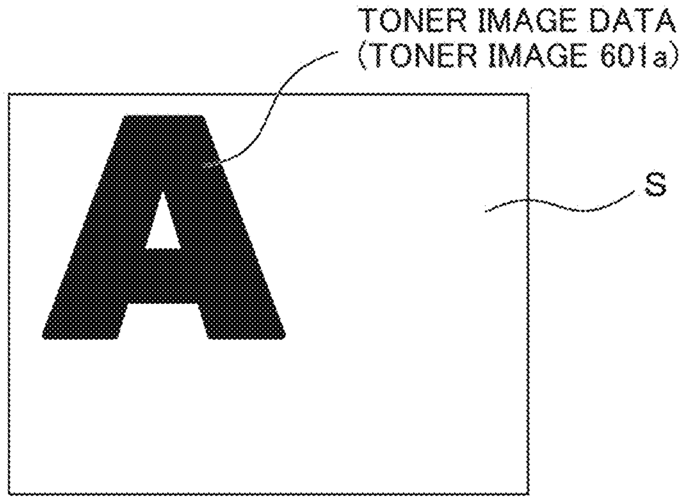
Figure 8:
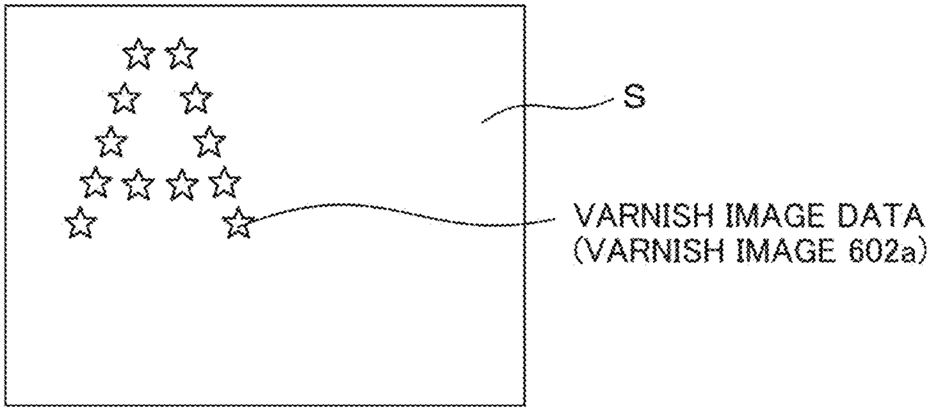

Part (a) of FIG. 8 is a schematic view showing a toner image based on toner image data after the layout change, and part (b) of FIG. 8 is a schematic view showing a varnish image based on varnish image data after the layout change.

Figure 9:
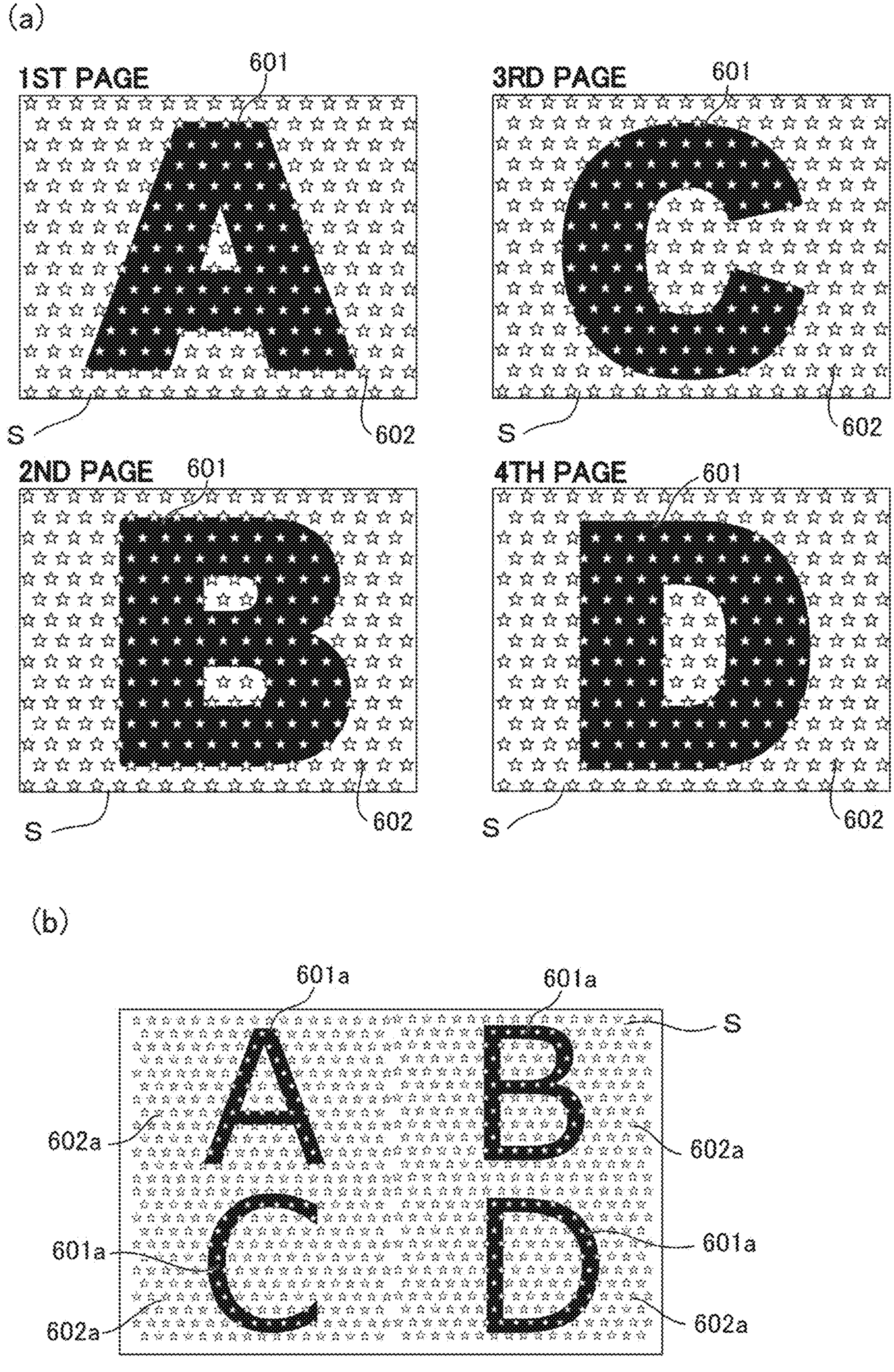

Part (a) of FIG. 9 is a schematic view showing toner images and varnish images before a plurality of pages are laid out in one page, and part (b) of FIG. 9 is a schematic view showing the case where layout change of the varnish images is made with layout change of the toner images.

Figure 10:
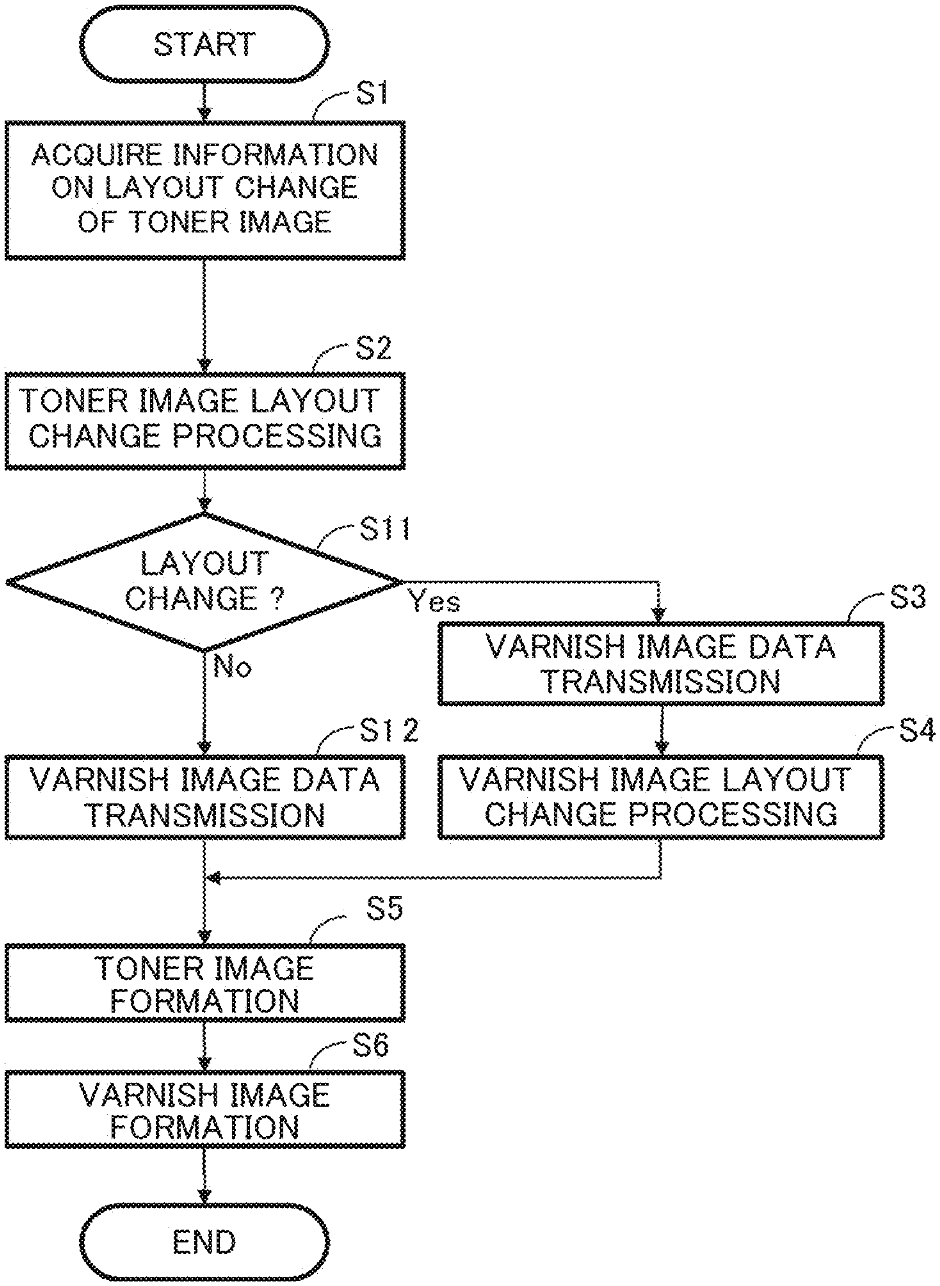

FIG. 10 is a flowchart showing layout change processing in a second embodiment.

Figure 11:
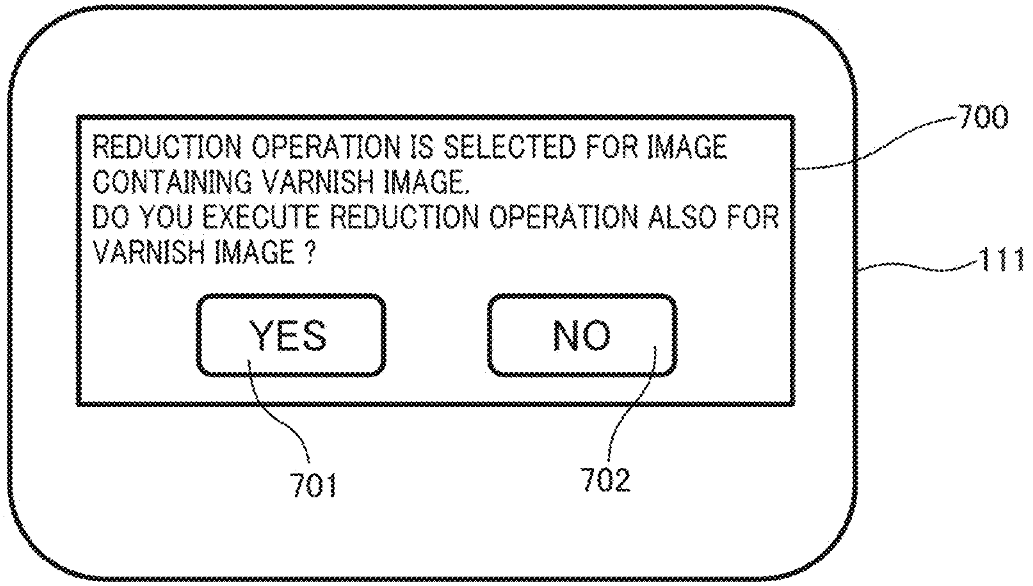

FIG. 11 is a schematic view showing a selection screen for selecting presence or absence of layout change of a varnish image.

Figure 12:
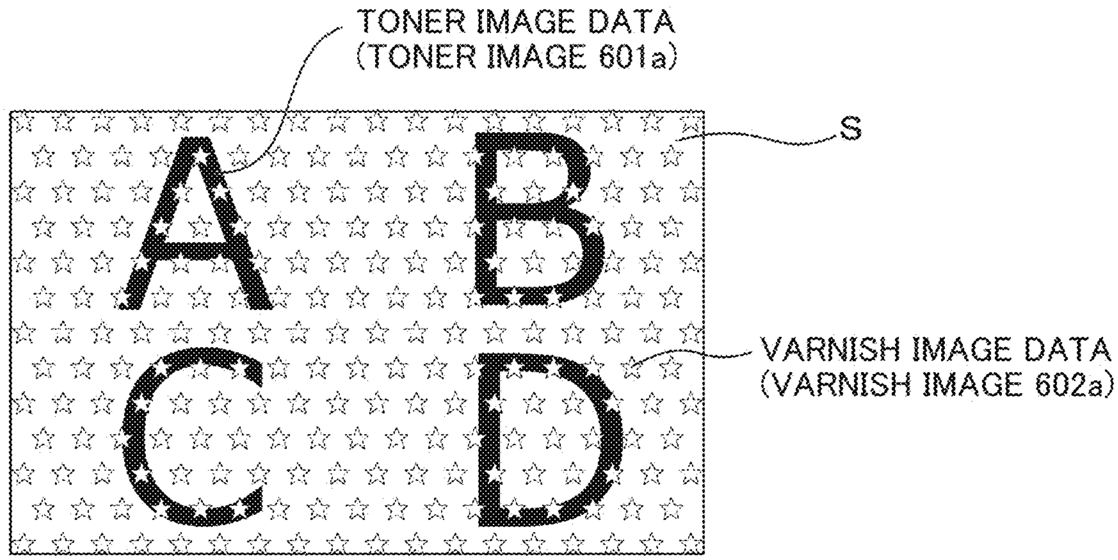

FIG. 12 is a schematic view showing a state during selection of absence of the layout change of the varnish image.

Figure 13:
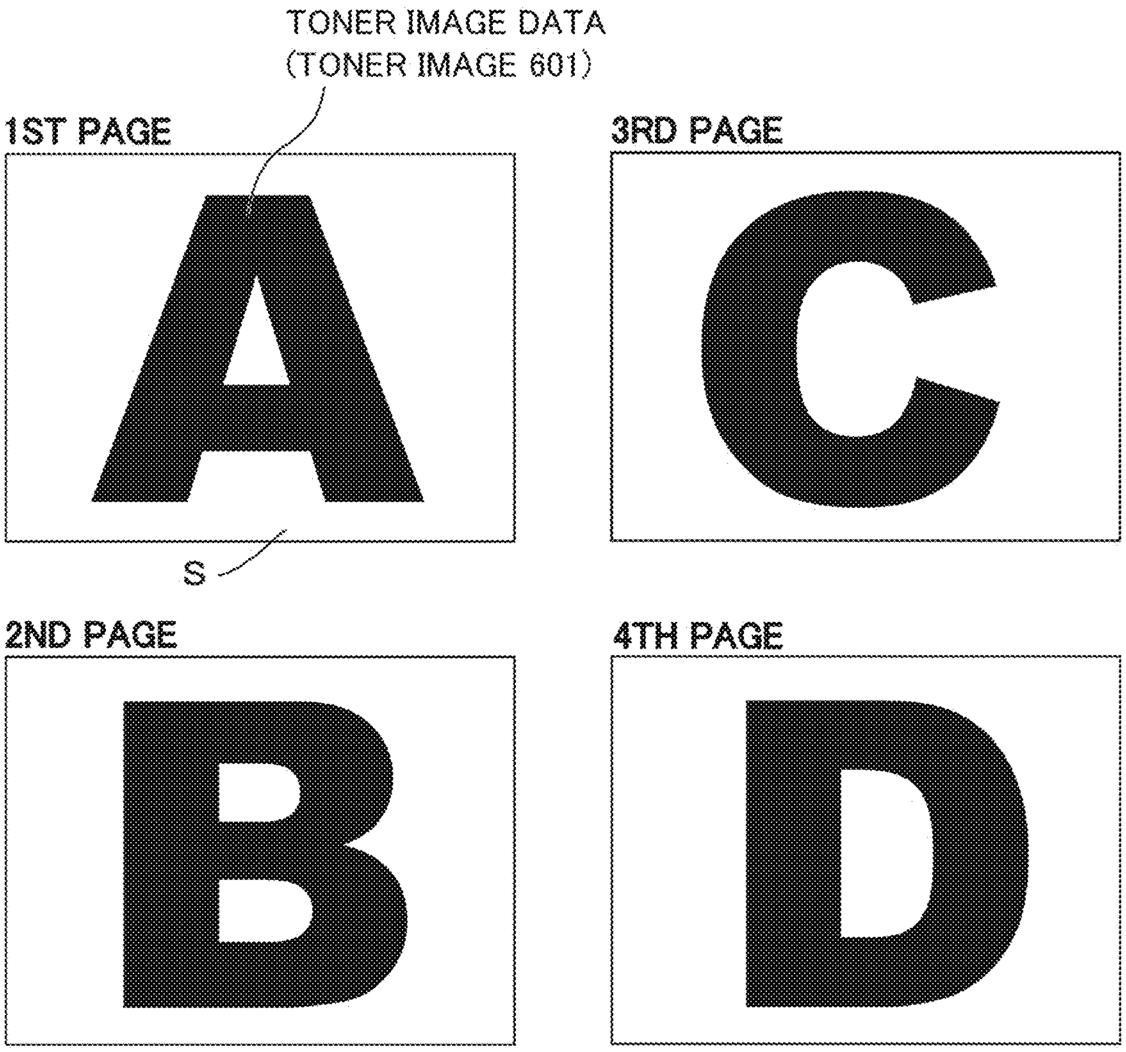

FIG. 13 is a schematic view showing toner images based on toner image data before layout change.

Figure 14:
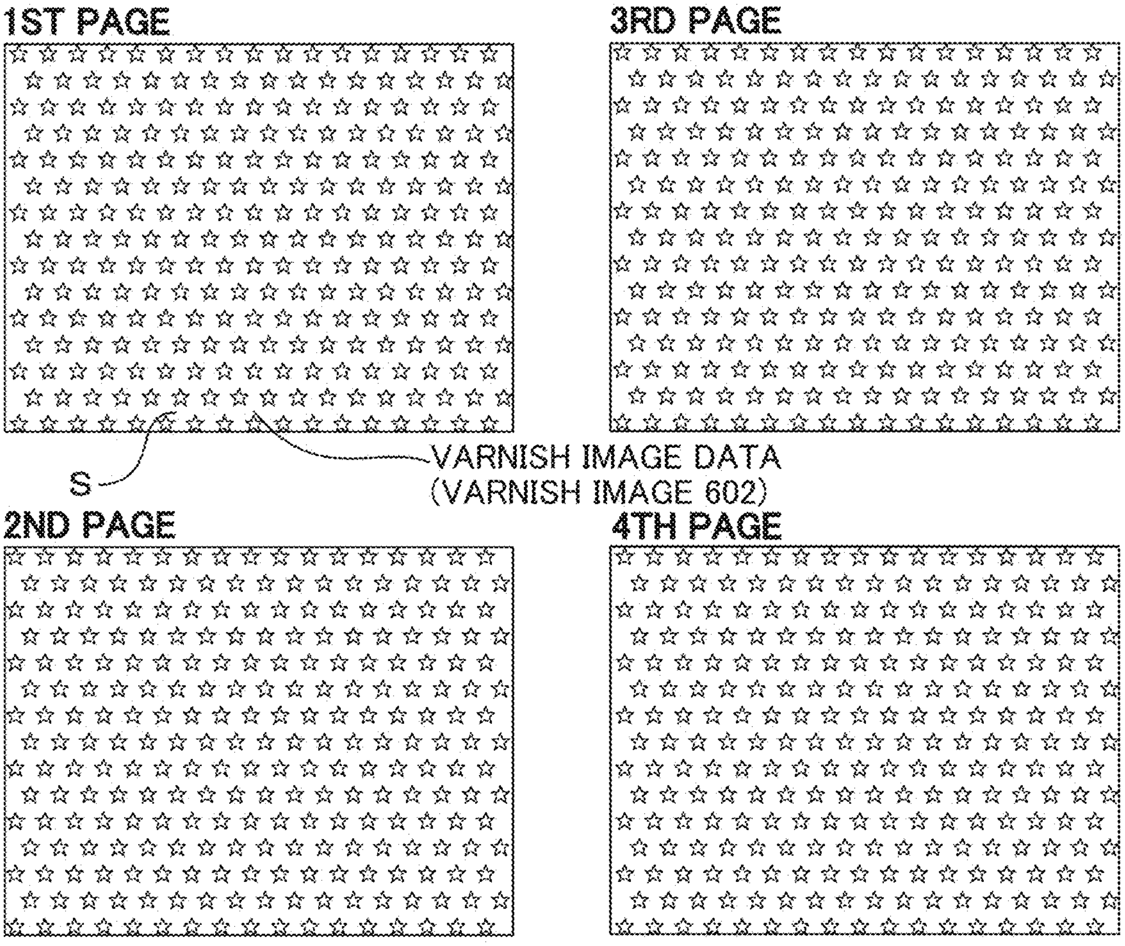

FIG. 14 is a schematic view showing varnish images based on varnish image data before layout change.

Figure 15:
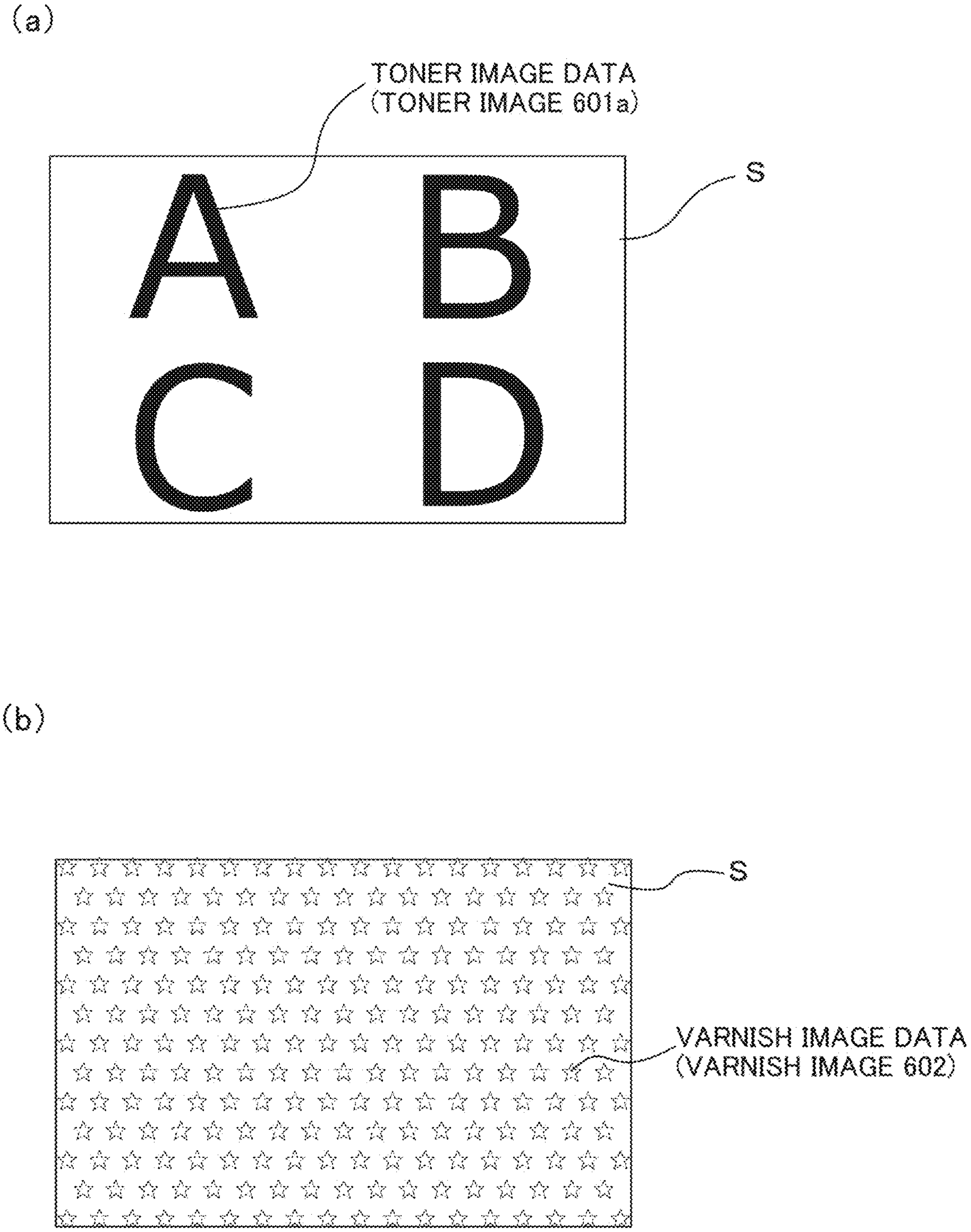

Part (a) of FIG. 15 is a schematic view showing the toner images based on the toner image data after the layout change, and part (b) of FIG. 15 is a schematic view showing the varnish images based on the varnish image data after the layout change.

DESCRIPTION OF THE EMBODIMENTS

First Embodiment

Figure 1:
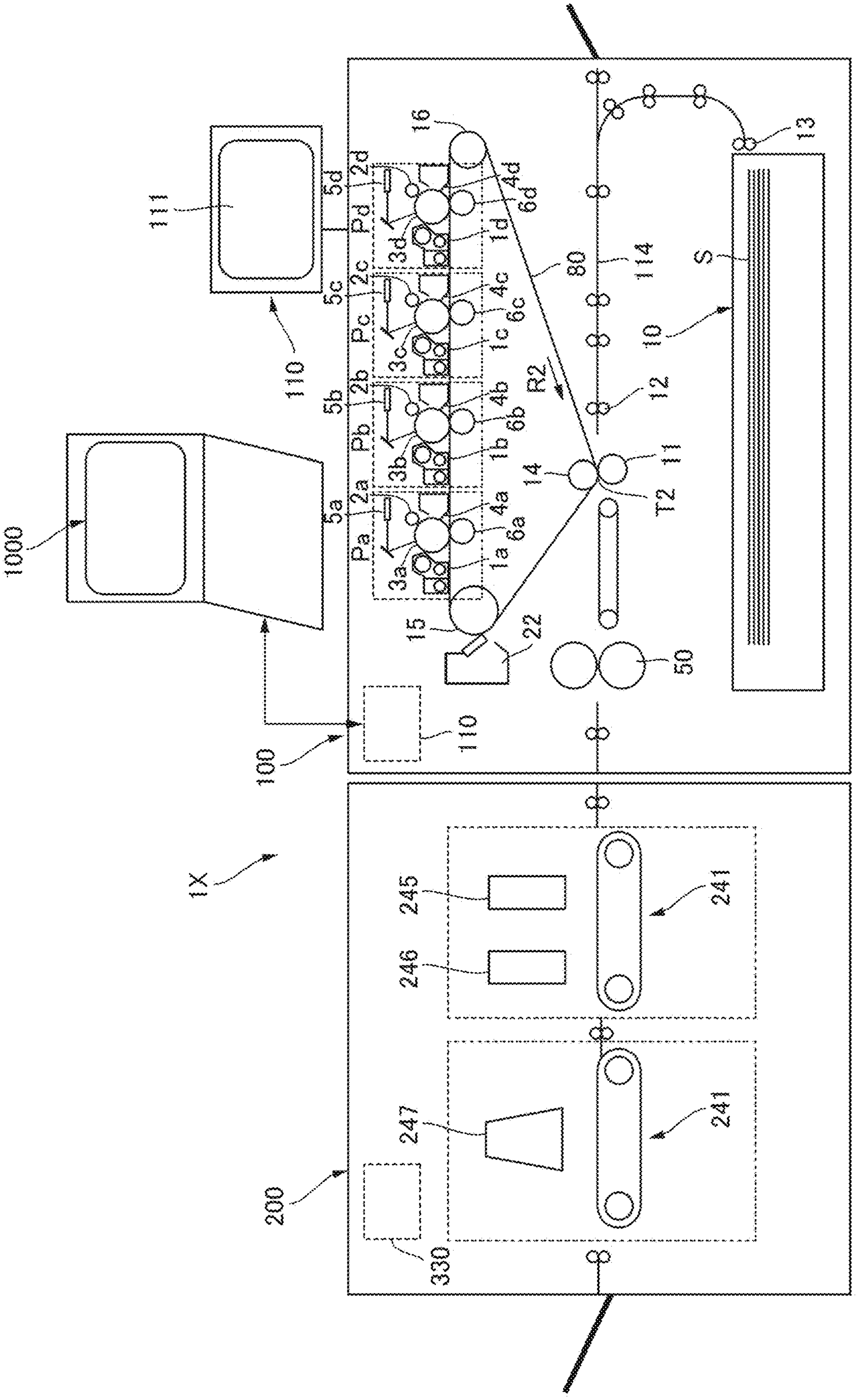
FIG. 1 is a schematic view showing a structure of an image forming system.

First, an image forming system 1X of this embodiment will be described using FIG. 1. The image forming system 1X shown in FIG. 1 includes an image forming apparatus 100 for forming a toner image on a recording material S and a varnish applying apparatus (referred to as a varnish coater) 200 for forming a varnish image on the recording material S. The varnish coater 200 is a post step unit retrofittable to the image forming apparatus 100 for expanding function, and the image forming apparatus 100 and the varnish coater 200 are connected to each other so as to be capable of delivering the recording material S therebetween. The image forming apparatus 100 and the varnish coater 200 are connected to each other by data input/output interfaces (not shown) so as to be capable of sending and receiving control signals and data therebetween. The recording material S on which the toner image is formed by the image forming apparatus 100 is conveyed toward the varnish coater 200 for the purpose of improving glossiness, water resistance, friction resistance, and the like of the toner image formed on the recording material S, so that the varnish image is formed on the recording material S separately from the toner image by the varnish coater 200. Formation of the varnish image by the varnish coater 200 will be described later.

Incidentally, although illustration is omitted, the image forming system 1X may include another post-step unit, such as a relay apparatus, a finisher apparatus, or the like. The relay apparatus is disposed between the image forming apparatus 100 and the varnish coater 200, and reverses and sends the recording material S, conveyed from the image forming apparatus 100, to the varnish coater 200 or sends the recording material S to the varnish coater 200 after temporarily stacking the recording material S. The finisher apparatus performs, for example, punching such that the recording material S is perforated or stapling such that a plurality of recording materials S are bundled and stapled, and then the perforated recording material S or the bundle of the stapled recording materials S is discharged. Further, in addition to these post-step units, for example, the image forming system 1X may include a recording material supplying apparatus (not shown) capable of accommodating recording materials S therein in a large amount, in which the recording material S may be supplied from the recording material supplying apparatus to the image forming apparatus 100.

<Image Forming Apparatus>

The image forming apparatus 100 will be described. The image forming apparatus 100 is an electrophotographic full-color printer of a tandem type. The image forming apparatus 100 includes image forming portions Pa, Pb, Pc, and Pd for forming images of yellow, magenta, cyan, and black, respectively. The image forming apparatus 100 forms a toner image on the recording material S on the basis of data relating to the toner image included in image data sent from an original reading device (not shown) connected to, for example, the image forming apparatus 100 or from an external device 1000 such as a personal computer connected to the image forming apparatus 100. As the recording material S, it is possible to cite sheet materials, such as plain paper, thick paper, roughened paper, uneven paper and coated paper.

A feeding process of the recording material S in the image forming apparatus 100 will be described. The recording materials S are accommodated is a cassette 10 in a stacked form, and are sent from the cassette 10 in synchronism with an image forming timing by a supplying roller 13. The recording material S sent by the supplying roller 13 is conveyed toward a registration roller pair 12 provided in the course of a feeding (conveying) passage 114. Then, the recording material S is subjected to oblique movement correction or timing correction by the registration roller pair 12, and thereafter, is sent to a secondary transfer portion T2. The secondary transfer portion T2 is a transfer nip formed by an inner secondary transfer roller 14 and an outer secondary transfer roller 11, and the toner image is transferred onto the recording material S in response to application of a secondary transfer voltage to the outer secondary transfer roller 11.

As regards the recording material S feeding process until the above-described secondary transfer portion T2, an image forming process of the image sent to the secondary transfer portion T2 at a similar timing will be described. First, although the image forming portions will be described, the respective color image forming portions Pa, Pb, Pc and Pd are constituted substantially similar to each other except that colors of toners used in developing devices 1*a*, 1*b*, 1*c* and 1*d* are yellow (Y), magenta (M), cyan (C), and black (K), respectively, which are different from each other. Therefore, in the following, as a representative, the image forming portion Pd for black will be described, and other image forming portions Pa, Pb and Pc will be omitted from description.

The image forming portion Pd is principally constituted by the developing device 1*d*, a charging device 2*d*, a photosensitive drum 3*d*, a photosensitive drum cleaner 4*d*, an exposure device 5*d*, and the like. A surface of a rotating photosensitive drum 3*d* is electrically charged uniformly in advance by the charging device 2*d*, and thereafter, an electrostatic latent image is formed by the exposure device 5*d* driven on the basis of a signal of image information. Then, the electrostatic latent image formed on the photosensitive drum 3*d* is developed into a toner image with use of a developer by the developing device 1*d*. Then, the toner image formed on the photosensitive drum 3*d* is primary transferred onto an intermediary transfer belt 80 in response to application of a primary transfer voltage to a primary transfer roller 6*d* disposed opposed to the image forming portion Pd while sandwiching the intermediary transfer belt 80 therebetween. Primary transfer residual toner slightly remaining on the photosensitive drum 3*d* is collected to the photosensitive drum cleaner 4*d*.

The intermediary transfer belt 80 is stretched by the inner secondary transfer roller 14, and stretching rollers 15 and 16, and is driven in an arrow R2 direction. In the case of this embodiment, the stretching roller 16 also functions as a driving roller for driving the intermediary transfer belt 80. The respective color image forming processes are carried out at timings when the associated toner image is superposedly transferred onto the upstream toner image primarily transferred onto the intermediary transfer belt 80. As a result, finally, a full-color toner image is formed on the intermediary transfer belt 80 and is conveyed to the secondary transfer portion T2. Incidentally, secondary transfer residual toner after passing through the secondary transfer portion T2 is removed from the intermediary transfer belt 80 by a transfer cleaner 22.

In the above, by the above-described feeding process and the above-described image forming process, in the secondary transfer portion T2, the timing of the recording material S and the timing of the full-color toner image coincide with each other, so that secondary transfer is carried out. Thereafter, the recording material S is conveyed to a fixing device 50, in which heat and pressure are applied to the recording material S, so that the toner image is fixed on the recording material S. The fixing device 50 nips and feeds the recording material S on which the toner image is formed, and applies heat and pressure to the fed recording material S, so that the fixing device 50 fixes the toner image on the recording material S. That is, the toner of the toner image formed on the recording material S is melted and mixed, and is fixed as the full-color image on the recording material S. Thus, a series of the image forming processes is ended. Then, in the case of this embodiment, the recording material S on which the toner image is fixed is conveyed from the image forming apparatus 100 to the varnish coater 200.

<Developer>

In this embodiment, a two-component developer containing the toner and a carrier is used. The toner contains a binder resin, a colorant, and a parting agent (wax). As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow (Y), magenta (M), cyan (C), and black (K), respectively.

As the parting agent, for example, it is possible to cite aliphatic hydrocarbon waxes such as low-molecular weight polyethylene, low-molecular weight olefin copolymer wax, microcrystalline wax, Fischer-Tropsch wax, and paraffin wax; oxide of the aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

<Varnish Coater>

Figure 2:
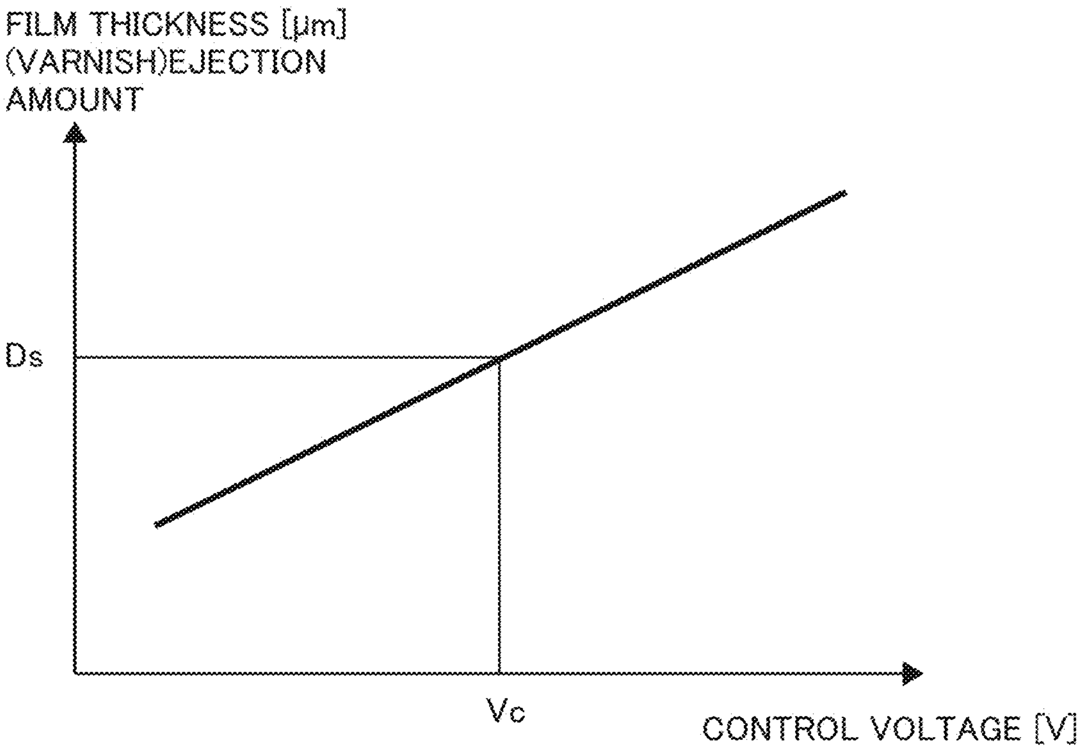
FIG. 2 is a graph showing a relationship between a control voltage and a film thickness which relate to varnish image formation.

Next, the varnish coater 200 will be described using FIGS. 1 and 2. The varnish coater 200 is a varnish applying apparatus of an ink jet type capable of forming varnish images such as characters, diagrams, graphics, and the like, which are desired by users. In the case of the ink jet type, varnish is ejected as droplets toward the recording material S, so that the varnish is deposited on the recording material S and thus the varnish image is formed. Incidentally, as the varnish, various varnishes such as an aqueous varnish, an oil varnish, and a UV varnish may be used, and in the following, the varnish coater 200 for fixing a varnish image with the UV varnish solidified by UV irradiation will be described as an example.

The varnish coater 200 is capable of forming the varnish image on the recording material on the basis of the varnish image data.

In the case of this embodiment, the image data includes varnish image data relating to the varnish image formed by the varnish coater 200. The varnish image data (second image data) relating to the varnish image is set separately from toner image data (first image data) relating to the toner images of the four colors of YMCK formed by the image forming apparatus 100.

The varnish coater 200 includes a sheet feeding portion 241, a position detecting portion 245, a varnish ejecting portion 246, and a varnish solidifying portion 247. The sheet feeding portion 241 feeds the recording material S while attracting the recording material S to a belt feeding surface by an air sucking device (not shown) through holes formed in a feeding belt 242. Along a sheet feeding passage of this sheet feeding portion 241, in an order from an upstream side toward a downstream side of a feeding direction (arrow X direction) of the recording material S, the position detecting portion 245, the varnish ejecting portion 246, and the varnish solidifying portion 247 are disposed. The position detecting portion 245 is a detecting portion using a CCD, or the like, for example, and with respect to the recording material S fed while being sucked on the belt feeding surface, the position detecting portion 245 detects each of a position of a leading end of the recording material S with respect to the feeding direction, a position of each of opposing end portions with respect to a widthwise direction, and a position of the toner image on the recording material S. The position of the toner image is detected by the position detecting portion 245, so that the varnish coater 200 is capable of overprinting the varnish image superposedly on the toner image.

The varnish ejecting portion 246 forms the varnish image on the recording material S by ejecting the UV varnish onto one surface (side) of the recording material S fed by the sheet feeding portion 241. The varnish ejecting portion 246 includes a plurality of print heads (not shown). The print heads are, for example, heads of a line type, in which a plurality of ejection ports (not shown) are arranged and disposed in the widthwise direction crossing the feeding direction of the recording material S so as to extend over a range covering a maximum width of the recording material S on which the image is capable of being formed by the varnish coater 200. A varnish ejecting method of the print heads may employ a type using heat generating elements, a type using piezo electric elements, a type using electrostatic elements, a type using MEMS elements, and the like. Although illustration is omitted, the UV varnish is supplied from a tank to the associated one of the print heads through a tube.

A film thickness of the varnish image is influenced by an application amount per unit area of the UV varnish onto the recording material S. The varnish amount (varnish application amount) can be changed by adjusting a varnish ejecting amount from the print heads. For example, in the case of the type using the piezoelectric elements, as shown in FIG. 2, the varnish ejection amount varies depending on adjustment of a control voltage, and the film thickness of the varnish image is adjusted depending on an increase and a decrease in varnish ejection amount per unit area. In the case of this embodiment, the film thickness of the varnish image is adjusted in a range of, for example, "5-100 μm", preferably "10-70 μm".

Further, a resolution of the varnish image capable of being formed by the varnish coater 200 is, for example, "600 dpi", and in that case, the line width of the varnish image is adjusted in a "600 dpi" unit. Incidentally, the above-described range of the film thickness of the varnish image, the resolution of the varnish image, and an adjusting range of the line width of the varnish image may be appropriately changed depending on the varnish ejecting method of the print heads, a kind of the varnish, and the like.

Returning to FIG. 1, the recording material S on which the varnish image is formed on one surface thereof by the varnish ejecting portion 246 is sent by the sheet feeding portion 241 to the varnish solidifying portion 247 positioned downstream of the varnish ejecting portion 246 with respect to the feeding direction, and then the UV varnish on the recording material S is solidified by the varnish solidifying portion 247. The varnish solidifying portion 247 includes a UV lamp, and the UV lamp irradiates the UV varnish with UV radiation (UV rays) of a wavelength corresponding to the varnish. The UV lamp is disposed in an almost entire region of the recording material S with respect to the widthwise direction so as to be capable of emitting the UV light (UV radiation), and is turned on only during passing of the recording material S. As described above, the varnish image is overprinted superposedly on the toner image formed on the recording material S.

The UV varnish used in this embodiment contains, as a main component, a photosensitive resin, a photosensitive monomer, a photoinitiator, an additive, and the like. As the photosensitive resin, for example, acrylic resin or the like having a (meth)acryloyl group is cited. As the photosensitive monomer, for example, a monomer, an oligomer, or the like in which at least one (meth)acryloyl group is contained in a molecule is cited. As the photoinitiator, for example, acetophenone, benzoin ethyl ether, 1-hydroxycyclohexyl phenyl ketone, or the like is cited. As the additive, for example, wax, plasticizer, leveling agent, solvent, polymerization inhibitor, antioxidant, photosensitizer, antifoaming agent, or the like is cited. The UV varnish may contain one or two or more species of these materials. Contents of respective components are not particularly limited, but it is preferable that the UV varnish contains the photosensitive resin in "1-20 wt. %", the photosensitive monomer in "30-70 wt. %", the photoinitiator in "5-15 wt. %", and the additive in "5 wt. %" or less, for example. As the UV varnish, it is possible to use, for example, "UV L Carton OP varnish (trade name)", "UVL Gloss OP varnish (tradename)", "UV Matt OP varnish (trade name)" and the like (manufactured by T&K TOKA CO., Ltd.).

Next, a control constitution of an image forming control system in the image forming system 1X will be described using FIG. 3 while making reference to FIG. 1. In this embodiment, an example in which the image forming apparatus 100 (specifically, the main controller 101) unitarily manages and controls an operation instruction to the varnish coater 200 was cited. Incidentally, to a main controller 101 and a varnish processing controller 330 which are described later, in addition to the devices (portions) illustrated in FIG. 3, various devices such as motors and power sources are connected, but are not the main object of the present invention herein, and therefore, will be omitted from illustration and description.

Figure 3:
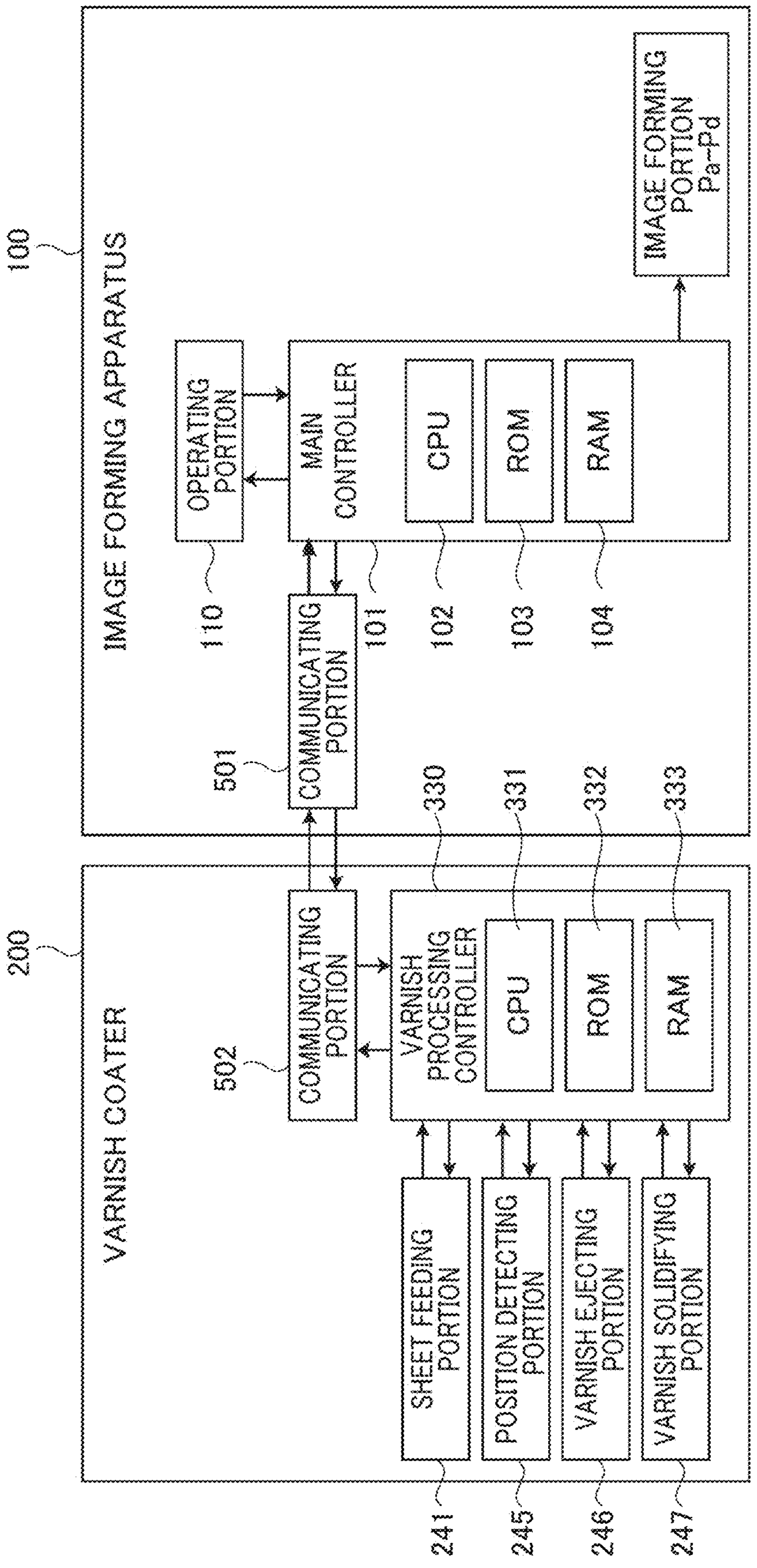
FIG. 3 is a control block diagram of an image formation control system in the image forming system.

In the image forming system 1X of this embodiment, as shown in FIG. 3, to the main controller 101 as a first image processing unit, the varnish processing controller 330 is connected via communication units 501 and 502 capable of establishing communication between the image forming apparatus 100 and the varnish coater 200 so as to be capable of communicating operation instructions and various data. In accordance with the operation instructions from the main controller 101, the varnish processing controller 330 as a second image process unit causes the varnish coater 200 to operate. Thus, while the main controller 101 controls the operation of the image forming apparatus 100, the main controller 101 is capable of controlling entirety of the image forming system 1X including the varnish coater 200 by sending the operation instructions and the various data to the varnish processing controller 300.

The above-described main controller 101 and the above-described varnish processing controller 330 may have the same constitution. For example, each of the controllers includes a CPU (central processing unit), a ROM (read only memory), and a RAM (random access memory).

The main controller 101 includes a CPU 102, a ROM 103, and a RAM 104. In the ROM 103, various programs such as "image forming processing" (not shown) and layout change processing" (see FIG. 5) (described later) are stored. In the RAM 104, various data such as image data acquired from an operating portion 110 or an external device 1000 are stored. Further, the RAM 104 is capable of temporarily storing a calculation (computation) processing result or the like with execution of the various programs.

The image forming apparatus 100 includes an operating portion 110 including, for example, a liquid crystal display portion 111, and the operating portion 110 is connected to the main controller 101. The operating portion 110 is, for example, a touch panel. On the liquid crystal display portion 111, various screens presenting the various programs and various data or the like can be displayed by the operating portion 110. Further, the operating portion 110 receives input of a start of the various programs and input of the various data, and the like, depending on a screen touch operation by a user. Incidentally, on the touch panel, a screen including various buttons, switches, and the like as keys or switches is displayed.

The user is capable of inputting a start of an image forming job from the operating portion 110. In the case where the start of the "image forming job" is inputted, the CPU 102 executes the "image forming processing" (not shown) stored in the ROM 103. With this execution, together with the image forming apparatus 100, the varnish coater is operated, so that the toner image and the varnish image are formed on the recording material S.

The varnish processing controller 330 includes a CPU 331, a ROM 332, and a RAM 333. The CPU 331 causes the sheet feeding portion 241, the position detecting portion 245, the varnish ejecting portion 246, and the varnish solidifying portion 247 of the varnish coater 200 to operate on the basis of a control program stored in the ROM 332. When the varnish processing controller 330 receives the varnish image data from the main controller 101, the varnish processing controller 330 causes the RAM 333 to store the received data, and causes the varnish coater 200 to form the varnish image on the recording material S on the basis of this varnish image data.

In the case of this embodiment, the user is capable of making layout change of the toner image formed on the recording material S by using the operating portion 110 or the external device 1000. From the operating portion 110 or the external device 1000, data change processing including at least one change, as toner image layout change, selected from magnification, reduction, arrangement, and the like is inputted.

Here, a conventional example in the case where the toner image layout change was made will be described using parts (a) and (b) of FIG. 4. Part (a) of FIG. 4 shows a toner image and a varnish image before the toner image layout change, and part (b) of FIG. 4 shows the toner image and the varnish image after the toner image layout change. Conventionally, as to the toner image formed on the recording material S, the user is capable of making the change such as the magnification, the reduction, the arrangement, or the like (hereinafter, this change is referred to as layout change for convenience).

As shown in part (a) of FIG. 4, on the recording material S before the toner image layout change, a toner image 601 in an "A" character shape is formed on the basis of the toner image data, and many varnish images 602 in a star shape are formed superposedly on the toner image 601. In the case where the reduction of the toner image 601 is performed as the layout change, as shown in part (b) of FIG. 4, on the recording material S, a toner image 601*a* reduced in size compared with the toner image 601 in part (a) of FIG. 4 is formed. However, in the case of the conventional example, the toner image is reduced in size, but the varnish image 602 is formed without being reduced in size.

In the case of the conventional example, even when the toner image 601 is reduced, the varnish image 602 is formed as it is without being reduced relative to the reduced toner image 601*a*, so that "deviation" occurs between the reduced toner image 601*a* and the varnish image 602. Also, in the case where the toner image 601 is magnified (enlarged), similarly, the "deviation" occurs. Therefore, conventionally, the user is required to make layout change of the varnish image separately from layout change of the toner image, but the varnish image layout change was troublesome and cumbersome. Therefore, in this embodiment, the varnish image layout change is performed with the toner image layout change without separately making the varnish image layout change by the user. In the following, description will be made.

<Layout Change Processing>

"Layout change processing" in this embodiment will be described using FIG. 5 to part (b) of FIG. 8 while making reference to FIG. 3 and part (a) of FIG. 4. The "layout change processing" is started by the main controller 101 in synchronism with, for example, input of a start of an image forming job and is repeated until an end of the image forming job. Incidentally, in the following, in order to make the description easy to understand, the case where as information on the layout change of the toner image 601, reduction information (for example, reduction rate or the like) is inputted and the toner image 601 is reduced in size will be described as an example.

As shown in FIG. 5, the main controller 101 acquires information on layout change of the toner image 601 inputted from the operating portion 110 or the like (S1). When the main controller 101 acquires the information on the layout change of the toner image 601, the main controller 101 executes the layout change processing of the toner image (S2). In the layout change processing of the toner image 601, the main controller 101 subjects toner image data on the toner image 601 which is a reduction object to data change processing (see part (a) of FIG. 7 and part (a) of FIG. 8).

Further, the main controller 101 transmits varnish image data to the varnish processing controller 330 (S3) and causes the varnish processing controller 330 to execute layout change processing of the varnish image 602 for decorating the toner image 601 which is the reduction object (S4). When the main controller 101 transmits the varnish image data to the varnish processing controller 330 through communication units 501 and 502, the main controller 101 transmits the varnish image data in association with data change processing on the toner image 601. In accordance with the associated data change processing on the toner image 601, the varnish processing controller 330 identifies, as a varnish image for decorating the toner image 601, the varnish image 602 positioned in the same coordinate as the toner image 601 which is the reduction object, and subjects varnish image data on the identified varnish image 602 to the data change processing. Thus, in the layout change processing of the varnish image 602, in accordance with the data change of the toner image 601, data change of the varnish image 602 identified in the varnish image data is made (see, part (b) of FIG. 7 and part (b) of FIG. 8).

Thereafter, the main controller 101 causes the image forming portion to form the toner image 601*a* on the basis of the toner image data after the data change (S5), and causes the varnish processing controller 330 to form a varnish image 602*a* on the basis of the varnish image data after the data change (S6).

FIG. 6 shows the toner image 601*a* after reduction and the varnish image 602*a* reduced depending on the reduction of the toner image 601*a* in this embodiment. As shown in FIG. 6, in this embodiment, the varnish image 602*a* is reduced in accordance with the reduced toner image 601*a* so that a relative positional relationship and a relative size relationship of the varnish image 602 with the toner image 601 shown in part (a) of FIG. 4 are maintained with reference to the toner image 601*a* after the reduction. That is, the varnish image 602 is subjected to reduction processing which is the same reduction processing to which the toner image 601 is subjected, so that the varnish image 602 is reduced to the varnish image 602*a*. Thus, with reference to the toner image 601*a* after the reduction, the varnish image 602*a* is reduced, so that the varnish image 602*a* is formed on the toner image 601*a* without being deviated, and even after the reduction, the relative positional relationship and size relationship between the toner image 601 and the varnish image 602 similar to those before the reduction are maintained.

Part (a) of FIG. 7 shows a toner image based on toner image data before the layout change, and part (b) of FIG. 7 shows a varnish image based on varnish image data before the layout change. Part (a) of FIG. 8 shows a toner image based on toner image data after the layout change, and part (b) of FIG. 8 shows a varnish image based on varnish image data after the layout change. Each of the toner image and the varnish image includes coordinate positions of many dots (pixels) constituting the associated toner image 601 or the varnish image 602 on the recording material S.

When reduction information on the toner image 601 is inputted from the operating portion 110 by the user, toner image data on the toner image 601 shown in part (a) of FIG. 7 is subjected to the data change processing, so that image data of the toner image 601*a* shown in part (a) of FIG. 8 is formed. The toner image data on the toner image 601 includes coordinate positions of many dots for forming the toner image on the recording material S, and the coordinate positions are changed in accordance with the reduction information of the toner image 601. By this, as shown in part (a) of FIG. 8, the toner image 601*a* reduced compared with the toner image 601 of part (a) of FIG. 7 is formed.

Then, with the change in coordinate position of the toner image data on the above-described toner image 601, with respect to the varnish image data on the varnish image shown in part (b) of FIG. 7, the coordinate positions of many dots for forming the varnish image on the recording material S are changed. By this, as shown in part (b) of FIG. 8, the varnish image 602*a* reduced compared with the varnish image 602 of part (b) of FIG. 7 is formed. The image data after the reduction includes the toner image data on the toner image 601*a* and the varnish image data on the varnish image 602*a*.

As described above, in this embodiment, in the case where layout change in toner image is executed, even when the user does not input layout change in varnish image for decorating the toner image, the varnish image is subjected to the same layout change with the toner image layout change. The varnish image layout change is made with the toner image layout change, so that "deviation" does not readily occur between the toner image and the varnish image after the layout change. Thus, the user is not required to make the varnish image layout change separately from the toner image layout change, so that formation of the toner image and the varnish image on the recording material S can be efficiently carried out. Accordingly, utilization efficiency of the image forming system 1X can also be improved.

Second Embodiment

Next, a second embodiment will be described. In the second embodiment, the user is made capable of arbitrarily selecting whether or not the above-described varnish image layout change is made with the toner image layout change. Before the second embodiment is described, the reason why the user is made capable of arbitrarily selecting the presence or absence of the varnish image layout change will be described using parts (a) and (b) of FIG. 9. Part (a) of FIG. 9 shows toner images and varnish images before toner image layout change, and part (b) of FIG. 9 shows the case where varnish image layout change was made with the toner image layout change.

In the case of an example shown in part (a) of FIG. 9, a toner image in an “A” character shape and many varnish images 602 in a star shape are formed on a first page (sheet), and a toner image in a “B” character shape and many varnish images 602 in a star shape are formed on a second page (sheet). Further, a toner image 601 in a “C” character shape and many varnish images 602 in a start star shape are formed on a third page (sheet), and a toner image 601 in a “D” character shape and many varnish images 602 in a star shape are formed on a fourth page (sheet). For each of the first to fourth pages of the recording material S, image data includes toner image data on the toner image 601 in the associated character shape “A”, “B”, “C”, or “D” and varnish image data on the many varnish images 602 in the star shape.

Here, as an example of the toner image layout change, the case where the four toner images formed on four recording materials S consisting of the above described first to fourth pages (sheets) of the recording materials S are collectively formed on a single recording material S will be considered. In this case, as shown in (b) of FIG. 9, four toner images 601*a* to which the toner images 601 of “A” to “D” are reduced, respectively, are collected and formed on the single recording material S.

In the above-described first embodiment, with such layout change of the toner images 601, also as regards the varnish images 602, reduction processing similar to the reduction processing of the toner images 601 is executed (see, S4 of FIG. 5).

At that time, the varnish image 602*a* reduced in conformity with a reduction rate of the toner image 601 so that a relative positional relationship and a relative size relationship of the varnish image 602 with the toner image 601 in each page shown in part (a) of FIG. 9 are maintained. However, when the varnish image 602 is reduced in conformity with the reduction rate of the toner image 601, there is a liability that the varnish image 602 is reduced to the extent such that the user is hard to visually recognize a decoration property. In order to avoid this, in the second embodiment, the user is made capable of selecting whether or not the varnish image layout change is made.

In the following, layout change processing in the second embodiment will be described using FIG. 10 to part (b) of FIG. 15 while making reference to FIG. 3 and parts (a) and (b) of FIG. 9. However, in the image forming processing (layout change processing), compared with the image forming processing (layout change processing) (see, FIG. 5), processings of steps S11 and S12 are added, and other processings are the same as those in the first embodiment. Therefore, in the second embodiment, the processings which are the same as those in the first embodiment are represented by the same reference numerals or symbols and will be briefly described or omitted from description. Incidentally, in the following, the case where the four toner images formed on the four recording materials S consisting of the first to fourth pages of the above described recording materials S, respectively, are collectively formed on the single recording material S will be described as an example.

As shown in FIG. 10, the main controller 101 acquires information on layout change of the toner image 601 inputted from the operating portion 110 (or the external device 1000) (S1). When the main controller 101 acquires the information on the layout change of the toner image 601, the main controller 101 executes the layout change processing of the toner image (S2). In the layout change processing of the toner image 601, the main controller 101 subjects toner image data on the four toner images 601 which are objects to data change processing (see FIG. 13 and part (a) of FIG. 15).

Then, the main controller 101 discriminates whether or not layout change processing of the varnish image is executed (S11). Whether or not the varnish image layout change is made can be selected by the user. For example, in the liquid crystal display portion 111 of the operating portion 110 as a selection unit, a selection screen 700 shown in FIG. 11 is displayed, so that the user is capable of selecting whether or not the varnish image layout change is made from the selection screen 700.

As shown in FIG. 11, on the selection screen 700, a message to the effect that whether or not the varnish image layout change is made with the toner image layout change is set and a “YES” button 701 and a “NO” button 702 are displayed. Depending on an operation of either one of the “YES” button 701 and the “NO” button 702 by the user, whether or not the varnish image layout change is made is set. In the case of this embodiment, setting is made so as to make the varnish image layout change when the “YES” button 701 is operated, and the setting is not made so as not to make the varnish image layout change when the “NO” button 702 is operated.

Returning to the description of FIG. 10, when the “YES” button 701 is operated in the above described selection screen 700 (Yes of S11), the main controller 101 transmits the varnish image data to the varnish processing controller 330 (S3), and causes the varnish processing controller 330 to execute the layout change processing on the four varnish images 602 for decorating the four toner images 601, respectively (S4). In the layout change processing of the varnish image 602, for each of pages of recording materials S, in accordance with the data change of the toner image 601, data change of the varnish image 602 identified in the varnish image data is made (see, FIG. 14 and part (b) of FIG. 15). Thereafter, the main controller 101 causes the image forming portion to form four toner images 601*a* only on a single page (sheet) on the basis of the toner image data after the data change (S5), and causes the varnish processing controller 330 to form four varnish images 602*a* only on a single page (sheet) on the basis of the varnish image data after the data change (S6).

On the other hand, when the “NO” button 702 is operated in the above-described selection screen 700 (No of S11), the main controller 101 transmits the varnish image data to the varnish processing controller 330 (S12). However, different from the case where the “YES” button 701 is operated in the selection screen 700, the main controller 101 causes the varnish processing controller 330 not to execute the layout change processing (see, S4) on the varnish image 602. Then, the main controller 101 causes the image forming portion to form the four toner images 601*a* only on the single page on the basis of the toner image data after the data change (S5), and causes the varnish processing controller 330 to form the four varnish images 602*a* only on the single page on the basis of the varnish image data (S6).

FIG. 12 shows the toner images 601*a* after reduction and the varnish images 602*a* which are not reduced depending on the reduction of the toner images 601*a* in the case where the "NO" button 702 is operated in the above-described selection screen 700. As shown in FIG. 12, in this embodiment, a relative positional relationship and a relative size relationship of the varnish image 602 with the toner image 601 shown in part (a) of FIG. 9 are not maintained with reference to the four toner images 601*a* after the reduction. That is, the varnish image 602 is not subjected to reduction processing which is the same reduction processing to which the toner image 601 is subjected, so that the varnish image 602 for the first page is formed without being changed. Thus, with reference to the toner image 601*a* after the reduction, the varnish image 602*a* is not reduced, so that the decoration property of the varnish image is maintained.

In the case where the "YES" button 701 is operated in the selection screen 700, as shown in part (b) of FIG. 9, reduced four toner images 601*a* of "A" to "D" and reduced four varnish images 602*a* are formed. The four varnish images 602*a* are prepared by reduction in conformity to a reduction rate of the toner images 601 so that the relative positional relationship and the relative size relationship of the varnish image 602 with the toner image 601 in each of the pages shown in part (a) of FIG. 9 are maintained. Accordingly, in the case where the user accepts a lowering in viewability of the decoration property, the user may only be required to select the "YES" button 701 in the selection screen 700, and in the case where the user desires to maintain the viewability of the decoration property, the user may only be required to select the "NO" button 702 in the selection screen 700. By this, the user is capable of easily ensuring a varnish image forming pattern depending on necessity of decoration.

Part (a) of FIG. 13 shows a toner image based on toner image data before the layout change, and part (b) of FIG. 14 shows a varnish image based on varnish image data before the layout change. Part (a) of FIG. 15 shows a toner image based on toner image data after the layout change, and part (b) of FIG. 15 shows a varnish image based on varnish image data in the case where the "NO" button 702 is operated.

The image data before the toner image layout change includes toner image data on the toner image 601 for each (one) page of the recording material S as shown in FIG. 13 and varnish image data on the varnish image 602 for each (one) page of the recording material S as shown in FIG. 14. In the layout change of the toner image 601, the toner image data on the toner images 601 shown in FIG. 13 is subjected to the data change processing, so that as shown in part (a) of FIG. 15, image data on the four toner images 601*a* is formed only on a single (one) page of the recording material S.

Further, in the case where the "YES" button 701 of the selection screen 700 is operated, for each page of the recording material S, the varnish image data on the varnish image 602 shown in FIG. 14 is changed with change of the toner image data on the associated toner image 601. By this, as shown in part (b) of FIG. 9, the varnish images 602*a* reduced compared with the varnish images 602 shown in part (a) of FIG. 9 are formed together with the toner images 601*a*.

On the other hand, in the case where the "NO" button 702 of the selection screen 700 is operated, varnish image data on the varnish images 602 is not changed with the change of the toner image data on the toner images 601. However, image data on the second to fourth pages of the recording materials S is deleted with the toner image layout change, so that the varnish image data on the varnish image 602 is included by the image data on the first page of the recording material S as shown in part (b) of FIG. 15. By the above described toner image data shown in part (a) of FIG. 15 and the varnish image data shown in part (b) of FIG. 15, an image shown in FIG. 12 is formed on the recording material S.

As described above, in this embodiment, in the case where the toner image layout change is made, the user was made capable of selecting whether or not the varnish image layout change is made with the toner image layout change. In the case where the user accepts the lowering in decoration property of the varnish image for the toner image, the user may only be required to select execution of the layout change so as to make the varnish image layout change with the toner image layout change. On the other hand, in the case where the user desires to maintain the decoration property of the varnish image for the toner image, the user is capable of selecting that the varnish image layout change is not made with the toner image layout change. By this, the user is capable of easily and selectively forming the varnish image in a formation pattern depending on necessity of decoration by the varnish image.

According to the present invention, with at least one data change processing of reduction, magnification, and arrangement of the toner image, the varnish image is subjected to data change processing which is the same as the data change processing of the toner image, so that the varnish image is formed on the recording material by being reduced, magnified, arranged or the like similarly as in the case of the toner image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-112117 filed on Jul. 13, 2022, which is hereby incorporated by reference herein in its entirety.

What is claimed is:

1. A varnish applying apparatus comprising:

an input unit configured to receive data change processing information including at least one of reduction, magnification, and arrangement of first image data from an image forming apparatus;

a varnish applying unit configured to form a varnish image on a recording material on the basis of second image data; and an image processing unit configured to execute data change processing in which the second image data is changed on the basis of the data change processing information for the first image data, wherein the varnish applying unit forms the varnish image on the recording material on the basis of image data obtained by subjecting the second image data to the data change processing.

2. The varnish applying apparatus according to claim 1, wherein the image processing unit carries out image processing on the basis of the data change processing information transmitted via a communication unit capable of establishing data communication between the image forming apparatus and the varnish applying apparatus.

3. The varnish applying apparatus according to claim 1, wherein the data change processing is the same processing as layout change processing executed by the image forming apparatus.

4. A varnish applying apparatus comprising:

an input unit configured to receive data change processing information including at least one of reduction, magnification, and arrangement of first image data from an image forming apparatus;

a varnish applying unit configured to form a varnish image on a recording material on the basis of second image data;

an image processing unit configured to execute data change processing in which the second image data is changed on the basis of the data change processing information for the first image data; and a selecting unit provided in the image processing unit and configured to select whether or not the second image data is to be subjected to the data change processing, wherein in a case that selection that the second image data is to be subjected to the data change processing is made, the varnish applying unit forms the varnish image on the recording material on the basis of image data obtained by subjecting the second image data to the data change processing by the image processing unit, and wherein in a case that the selection that the second image data is to be subjected to the data change processing is not made, the varnish applying unit forms the varnish image on the recording material on the basis of the second image data which is not subjected to the data change processing.

5. The varnish applying apparatus according to claim 4, wherein the image processing unit carries out image processing on the basis of the data change processing information transmitted via a communication unit capable of establishing data communication between the image forming apparatus and the varnish applying apparatus.

6. The varnish applying apparatus according to claim 4, wherein the data change processing is the same processing as layout change processing executed by the image forming apparatus.

* * * * *